(12) United States Patent
Van Der Mei et al.

(10) Patent No.: US 10,260,614 B2
(45) Date of Patent: Apr. 16, 2019

(54) CAM FOLLOWER WITH ANTI-ROTATION DEVICE

(71) Applicant: AKTIEBOLAGET SKF, Göteborg (SE)

(72) Inventors: Nijs Van Der Mei, Utrecht (NL); Benoît Hauvespre, Mettray (FR)

(73) Assignee: Aktiebolaget SKF, Göteborg (SE)

( * ) Notice: Subject to any disclaimer, the term of this patent is extended or adjusted under 35 U.S.C. 154(b) by 400 days.

(21) Appl. No.: 14/647,942

(22) PCT Filed: Nov. 29, 2013

(86) PCT No.: PCT/EP2013/075143
§ 371 (c)(1),
(2) Date: May 28, 2015

(87) PCT Pub. No.: WO2014/083174
PCT Pub. Date: Jun. 5, 2014

(65) Prior Publication Data
US 2015/0337939 A1 Nov. 26, 2015

(30) Foreign Application Priority Data

Nov. 29, 2012 (FR) ...................................... 12 03228

(51) Int. Cl.
F16H 53/06 (2006.01)
F02M 59/10 (2006.01)
(Continued)

(52) U.S. Cl.
CPC ............... F16H 53/06 (2013.01); F01L 1/14 (2013.01); F02M 59/102 (2013.01);
(Continued)

(58) Field of Classification Search
CPC ... F16H 53/06; F01L 1/181; F01L 1/14; F01L 1/143; F01L 2105/02; F01L 2107/00; F02M 59/102; F04B 9/042; F04B 1/0426
See application file for complete search history.

(56) References Cited

U.S. PATENT DOCUMENTS 3,108,580 A 10/1963 Crane, Jr.
3,668,945 A * 6/1972 Hofmann ............. F02M 59/102
123/90.5
(Continued)

FOREIGN PATENT DOCUMENTS

DE 102005047234 A1 4/2007
DE 102006031032 A1 1/2008
(Continued)

Primary Examiner — Thomas C Diaz
(74) Attorney, Agent, or Firm — Bryan Peckjian; SKF USA Inc. Patent Dept.

(57) ABSTRACT

A cam follower including a plunger intended to execute a reciprocating movement in an exterior body. The plunger includes a plunger body having a cylindrical exterior surface, an anti-rotation device extending radially beyond the cylindrical exterior surface of the pusher body and engaging via a matching structure in the exterior body, a roller providing the contact with a cam, and a sleeve rotatably supporting the roller in the plunger body. The plunger body includes at least one lateral bore and the sleeve is inserted in the bore. In order to avoid additional components and assembly steps to constitute the anti-rotation device, the present invention proposes to use one end of the sleeve as the anti-rotation device.

14 Claims, 4 Drawing Sheets

(51) Int. Cl.
  *F01L 1/14* (2006.01)
  *F04B 1/04* (2006.01)
  *F04B 9/04* (2006.01)

(52) U.S. Cl.
  CPC ............ *F04B 1/0439* (2013.01); *F04B 9/042* (2013.01); *F01L 2105/02* (2013.01); *F01L 2107/00* (2013.01); *Y10T 74/2107* (2015.01)

(56) References Cited

U.S. PATENT DOCUMENTS

| | | | |
|---|---|---|---|
| 5,307,769 A | | 5/1994 | Meagher et al. |
| 5,775,275 A | * | 7/1998 | Philo ........................ F01L 1/143 |
| | | | 123/90.5 |
| 2008/0190237 A1 | | 8/2008 | Radinger et al. |

FOREIGN PATENT DOCUMENTS

| | | | | |
|---|---|---|---|---|
| DE | 102008002378 A1 | | 12/2009 | |
| DE | 102010027608 A1 | * | 1/2012 | ................ F01L 1/25 |
| EP | 0608925 A1 | | 8/1994 | |
| EP | 0969184 A1 | | 1/2000 | |
| FR | 2830056 A1 | | 3/2003 | |
| GB | 2233418 A | | 1/1991 | |
| WO | 2010/048968 A1 | | 5/2010 | |

\* cited by examiner

CAM FOLLOWER WITH ANTI-ROTATION DEVICE

CROSS REFERENCE TO RELATED APPLICATIONS

This is a U.S. National Stage Application claiming the benefit of International Application Number PCT/EP2013/075143 filed on 29 Nov. 2013, which claims priority to France Patent Application 12/03228 filed on 29 Nov. 2012 (Nov. 29, 2012), which are incorporated herein by reference in their entireties.

FIELD OF THE INVENTION

The present invention concerns cam followers including a plunger with a roller providing the contact with a cam. Cam followers of this type are used in particular for fuel injection pumps, valve control and other similar systems in automotive applications. The invention is not applicable only to cam followers. Another application of the invention concerns the use of the device for other reciprocating elements including a sleeve disposed in a direction transverse to the direction of the reciprocating movement.

Prior ArtIn the field of cam followers, it is particularly important to ensure that the rotation axis of the roller remains aligned with the rotation axis of the cam in order to maintain a linear contact with a maximum area of contact between the roller and the cam.

Consequently, it is known that it is necessary to use anti-rotation devices projecting radially beyond the cylindrical exterior surface of the plunger body and engaging by means of a matching structure in said exterior body.

The document WO 2010/048968 proposes to insert an element substantially in the shape of a mushroom in a bore in the lateral wall of a substantially cylindrical reciprocating plunger. This element is designed to engage in the axial groove on the lateral wall of an exterior cylinder guiding the reciprocating plunger. It is moreover known that it is necessary to provide the plunger with an axial groove corresponding to an element projecting from the cylindrical interior wall guiding the reciprocating plunger.

These two solutions are characterized in that they feature a distinct element that has to be mounted on the cylinder or on the plunger, which necessitates an additional manufacturing step. Moreover, there is a risk of the element loosening, which can damage the device using the plunger.

OBJECT AND BRIEF SUMMARY OF THE INVENTION

The present invention aims to overcome these problems by using a cam follower that is economical, robust and easy to manufacture.

The invention proposes a cam follower including a plunger adapted to execute a reciprocating movement in an exterior body. The plunger includes a plunger body having a cylindrical exterior surface. An anti-rotation device is provided, characterized in that it projects radially beyond the cylindrical exterior surface of the plunger body. The anti-rotation device engages in said exterior body via a matching structure, notably via an axial rib the length of which is greater than the sum of the amplitude of the reciprocating movement and the axial length of the anti-rotation device.

The cam follower moreover includes a roller to provide the contact with a cam and a sleeve rotatably supporting the roller in the plunger body. The sleeve is oriented perpendicularly to the direction of the reciprocating movement. The plunger body includes at least one lateral bore and the sleeve is inserted in said bore.

The invention proposes that the anti-rotation device be one end of said sleeve. Using the end of the sleeve as the anti-rotation device avoids having recourse to the additional components and assembly steps that are generally required for this purpose. It is possible on the one hand to manufacture a cam follower at lower cost and on the other hand to limit the risk of losing the sleeve during transportation or assembly—which, in return, improves the reliability and the safety of the cam follower. In accordance with one embodiment of the invention, it is proposed that at least one of the axial ends of the sleeve be rounded. This is particularly advantageous in the case of a "free floating" sleeve, i.e. a sleeve that is not fixed axially, and makes it possible to avoid friction on and wear of the ends of the sleeve when they slide on the walls of the exterior body and/or on the bottom of the groove. Friction can furthermore be reduced by providing at least one axial end of the sleeve with an anti-friction coating.

In accordance with an alternative embodiment, it is proposed to fix the axial position of the sleeve inside the plunger body by means of a circlip. The position of the sleeve is preferably fixed so that the axial ends do not come into contact with the walls or the bottom of the matching structure or the groove, which makes it possible to avoid machining the ends to round them or coating them.

In accordance with one embodiment of the invention, the circlip is fixed to the sleeve in a position outside a wall of said plunger body. This embodiment simplifies assembly, the position in which the circlip is mounted being easily accessible.

In accordance with an alternate or additional embodiment, a circlip may be fixed to the sleeve positioned on the interior wall of the plunger body and in particular between the roller and the interior wall of the plunger body, the axial end of the roller including a groove adapted to receive the circlip.

Another economical way to fix the axial position of the sleeve inside the plunger body is by plastic deformation of the sleeve of rod shape, for example by bossing up.

Moreover, the projecting end of the sleeve may have a profile different from that of the main part of the sleeve. The end of the sleeve may have a non-circular profile, for example a rectangular or elliptical profile to improve sliding in the matching groove, prevent axial movements in the direction opposite to that of the projecting end and prevent rotation of the sleeve about its longitudinal axis, if required. Furthermore, the invention proposes to provide the sleeve with a bolt head constituting said anti-rotation device for any of the abovementioned purposes.

The following non-limiting description of embodiments of the invention and the claims and appended drawings show specific combinations of the multiple features of the invention. A person skilled in the art can easily produce other combinations or sub-combinations of these features in order to adapt the invention as defined in the claims to their specific requirements.

BRIEF DESCRIPTION OF THE DRAWINGS

The present invention and its advantages will be better understood by studying the detailed description of specific embodiments given by way of non-limiting examples and illustrated by the appended drawings in which.

DETAILED DESCRIPTION OF PARTICULAR EMBODIMENTS

Figure 1:
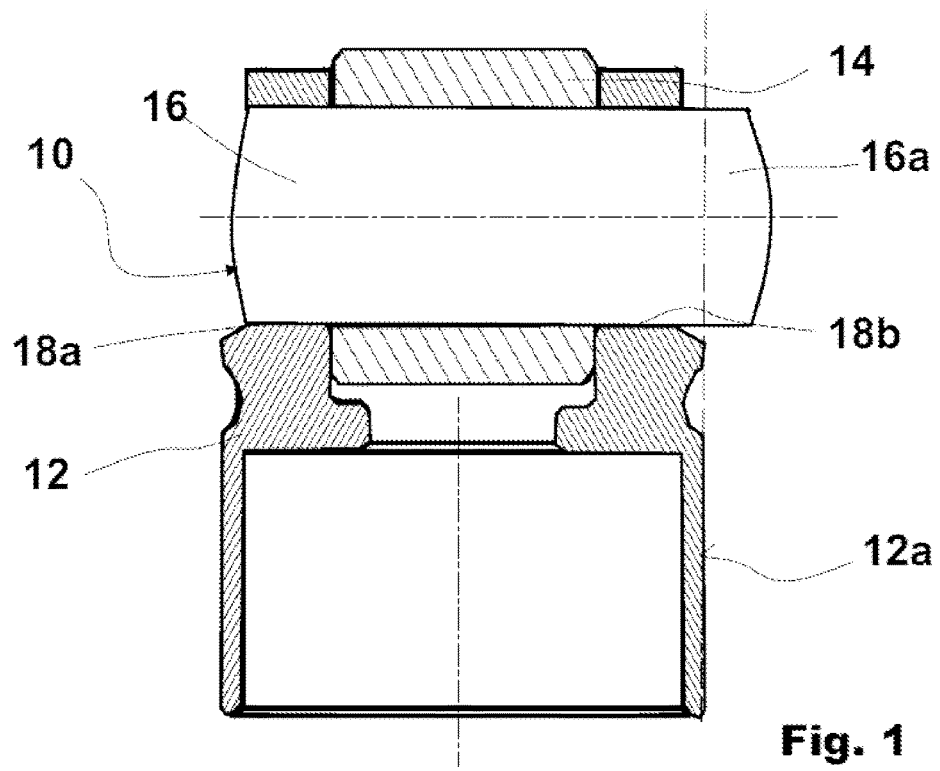
FIG. 1 is a sectional view of a cam follower in accordance with a first embodiment of the invention characterized in that the sleeve is free floating.
Figure 2:
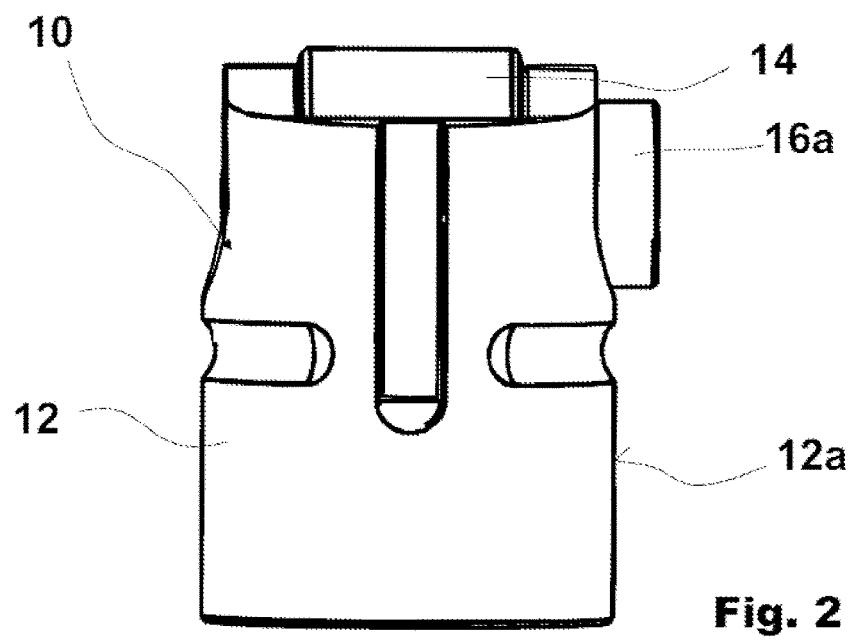
FIG. 2 shows the cam follower shown in FIG. 1.
Figure 3:
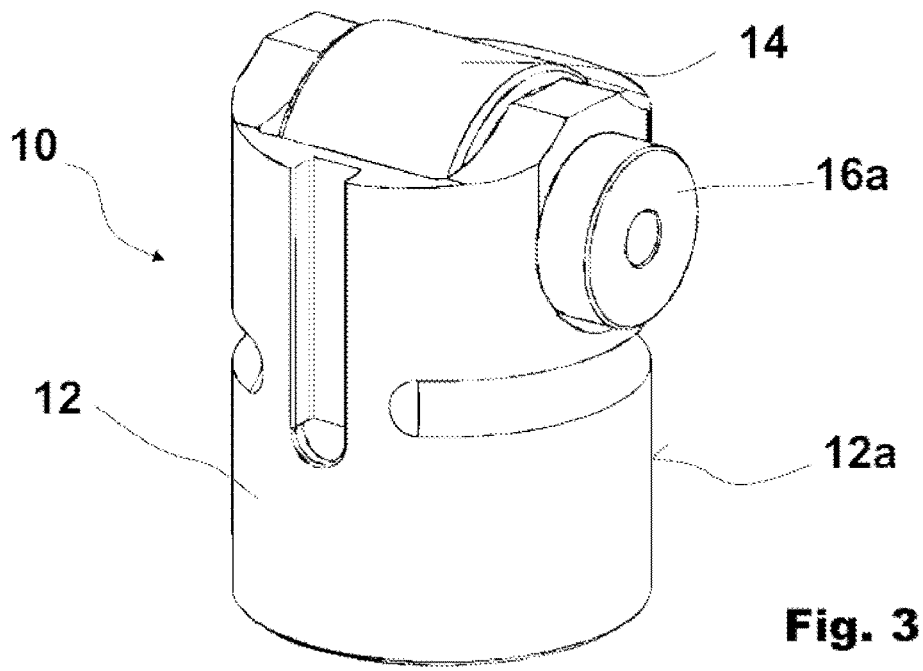
FIG. 3 is a perspective view of the cam follower shown in FIGS. 1 and 2.

FIGS. 1 to 3 are diagrammatic representations of a cam follower in accordance with the invention including a plunger 10 adapted to execute a reciprocating movement in an exterior body (not shown). The plunger 10 includes a plunger body 12 having a cylindrical exterior surface 12a. A roller 14 projects axially from the plunger body 12; it is designed to provide the contact with a cam, for example in an internal combustion engine, and to be driven by the cam in order to execute a reciprocating movement. In accordance with a preferred embodiment, the cam follower is used to drive the piston of a fuel injection pump in an internal combustion engine. An opening at the rear of the plunger, at the end opposite the axial end where the roller 14 is mounted, is adapted to receive a piston rod spring-loaded by a coil spring.

The roller 14 is mounted in a recess in the plunger body 12 corresponding to the shape of the roller 14. A bottom of the recess is open toward the rear opening to enable a lubricant to flow toward the roller 14 and the cam.

A sleeve 16 is fitted, its longitudinal direction being oriented orthogonally to the direction of the reciprocating movement, which is parallel to the central axis of the exterior surface 12a of the plunger body. The sleeve 16 is inserted in a central bore of the roller 14 to support the roller 14 rotatably in the plunger body 12 so that the rotation axis of the roller 14 is parallel to the rotation axis of the cam with a high level of precision. The roller 14 may be supported on the sleeve 16 by a smooth bearing, a roller bearing or a needle bearing, according to the technical requirements.

The sleeve 16 is oriented perpendicularly to the direction of the reciprocating movement. The plunger body 12 includes two facing lateral bores 18a, 18b, the sleeve 16 being inserted in the bores 18a, 18b. An anti-rotation device is provided that is designed to project from the cylindrical exterior surface 12a of the plunger body 12. An axial rib on the anti-rotation device extending all the length of the guide bore engages in the exterior body.

The end 16a of the sleeve 16 projects beyond the cylindrical exterior surface 12a or a continuation thereof and the invention proposes to use this end 16a as an anti-rotation device. Using the end 16a of the sleeve 16 as an anti-rotation device avoids recourse to the additional components and assembly steps generally required for this purpose and it is possible to manufacture a cam follower at lower cost.

In accordance with the embodiment of FIGS. 1 to 3, both axial ends of the sleeve 16 are rounded and the sleeve is "free floating", i.e. is not fixed axially. Moreover, the axial ends of the sleeve 16 have an anti-friction coating.

FIGS. 4 to 8 show other possible embodiments of the invention. To avoid repetition, the following description concentrates on the differences with respect to the embodiment of FIGS. 1 to 3, and the reader should refer to the description of FIG. 1 for similar or identical features. In order to highlight the common functioning or concept, identical or similar reference numbers are used for features having identical or very similar functions.

Figure 5:
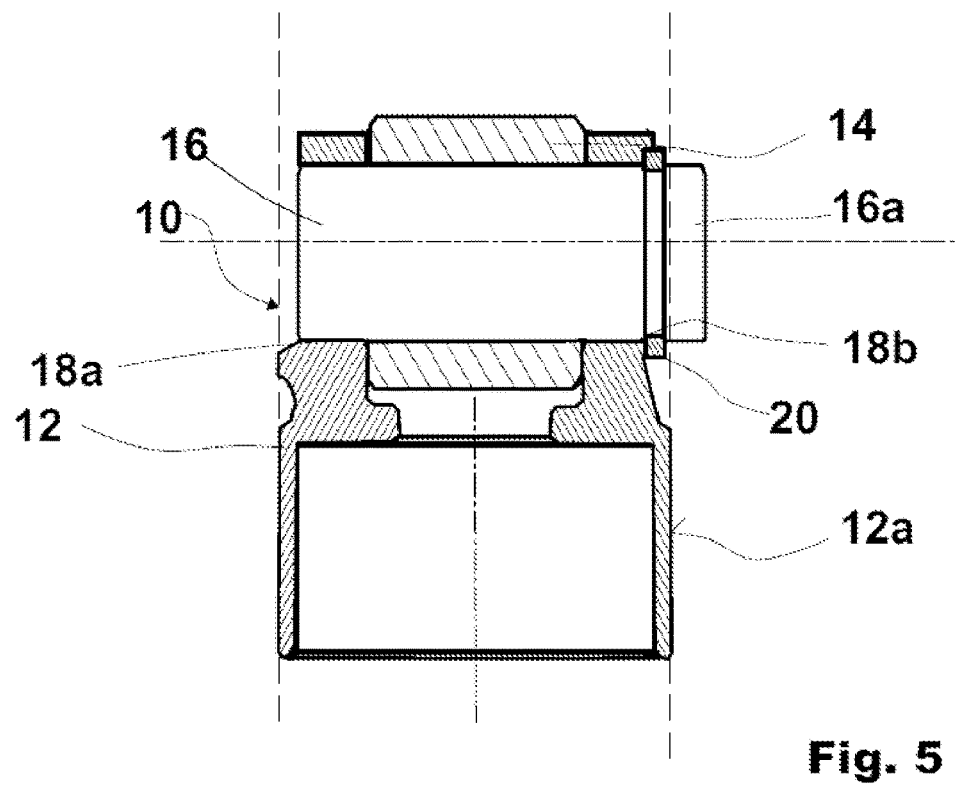
FIG. 5 is a sectional view of a cam follower in accordance with a third embodiment of the invention characterized in that the sleeve is fixed by a circlip outside a plunger body.

FIG. 5 shows a second embodiment of the invention characterized in that the sleeve 16 is fixed inside the plunger body 12 by a circlip 20. The position of the sleeve 16 is fixed so that the axial ends do not come into contact with the walls or the bottom of the matching structure or the groove, which makes it possible to avoid machining the ends to round them or coating them.

The circlip 20 is fixed to the end 16a of the sleeve 16 positioned on the exterior wall of said plunger body 12 directly adjoining the wall of the plunger body 12. The circlip 20 engages in a circumferential groove (not shown) in the exterior surface of the sleeve 16. The sleeve 16 features a central bore that reduces its weight and simplifies handling it when the axial ends are machined or coated.

Figure 4:
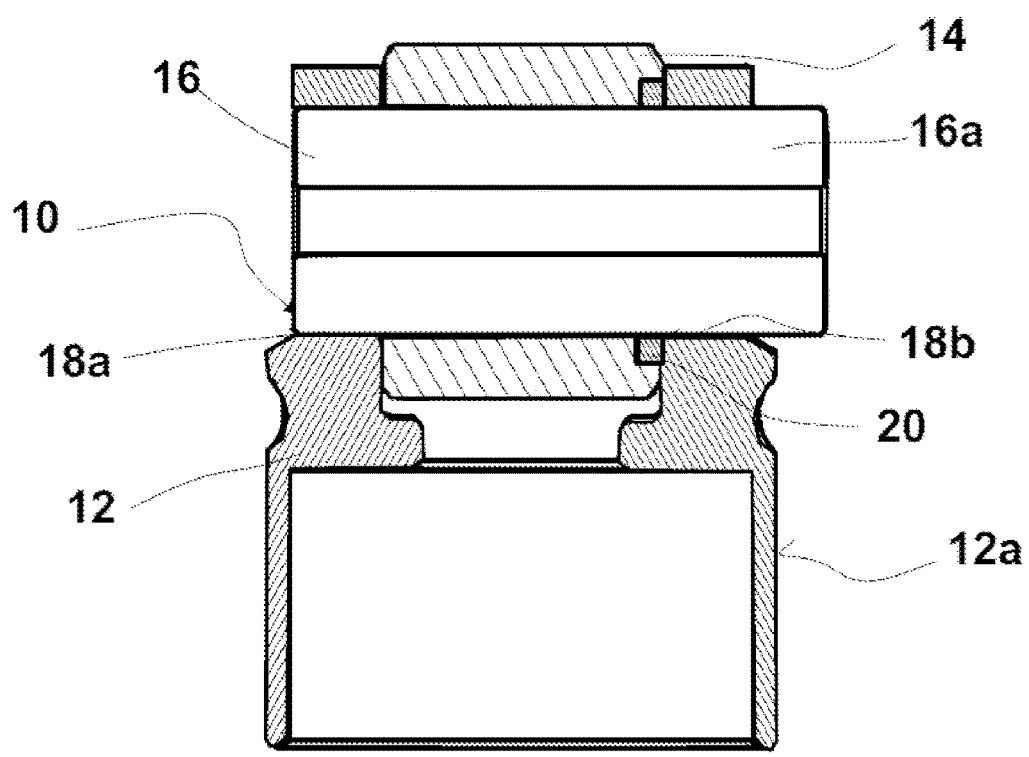
FIG. 4 is a sectional view of a cam follower in accordance with a second embodiment of the invention characterized in that the sleeve is fixed by a circlip on the interior wall of a plunger body.

FIG. 4 shows a third embodiment of the invention characterized in that a circlip 20 is fixed to the sleeve 16 positioned on the interior wall of said plunger body 12 and in particular between the roller 14 and the interior wall of the plunger body 12, the axial end of the roller 14 including a groove adapted to receive the circlip 20. The circlip 20 engages in a circumferential groove 22 on the exterior surface of the sleeve 16.

Figure 6:
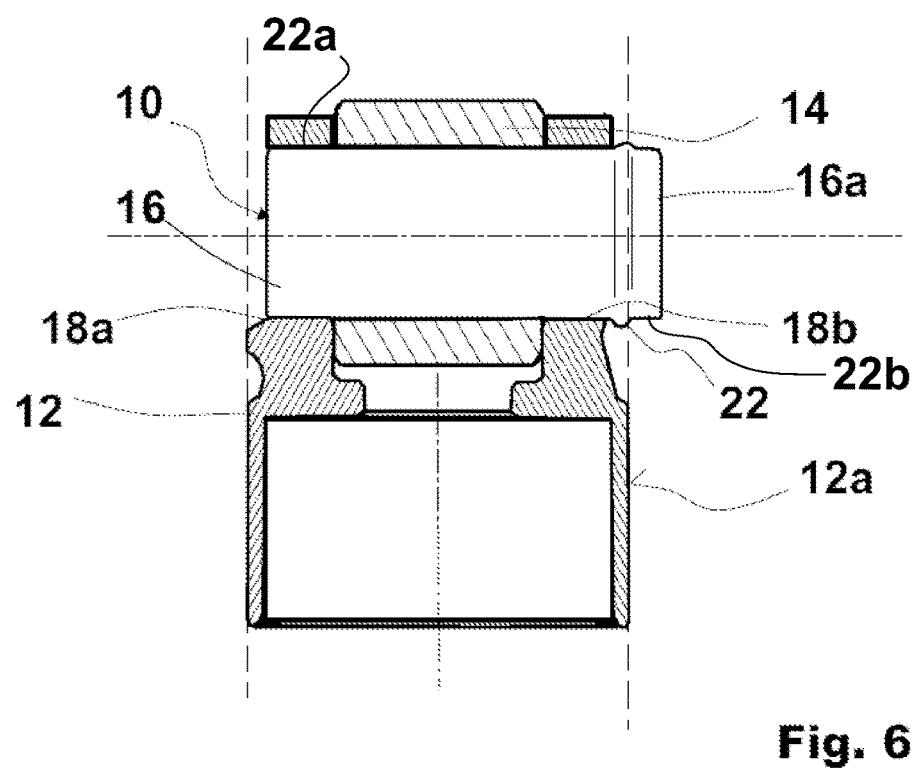
FIG. 6 is a sectional view of a cam follower in accordance with a fourth embodiment of the invention characterized in that the sleeve is fixed by plastic deformation.

Another economical way to fix the axial position of the sleeve 16 inside the plunger body 12 is by a plastic deformation 22 of the sleeve 16 of rod shape, for example by bossing up. FIG. 6 is a diagrammatic representation of this. The plastic deformation 22 of the sleeve is on an axially intermediate portion of the exterior surface 22a of the sleeve so that the sleeve has a shaft end portion 22b constituting all or part of the anti-rotation device. The plastic deformation advantageously extends all around the circumference of the exterior surface 22a of the sleeve. In another embodiment of the invention, this plastic deformation 22 extends around only a circumferential portion of the exterior surface 22a of the sleeve, at one or more locations. The plastic deformation 22 of the sleeve bears against an exterior surface of the plunger body in order to position the sleeve axially in the bore or bores 18a, 18b of the plunger body 12.

Figure 7:
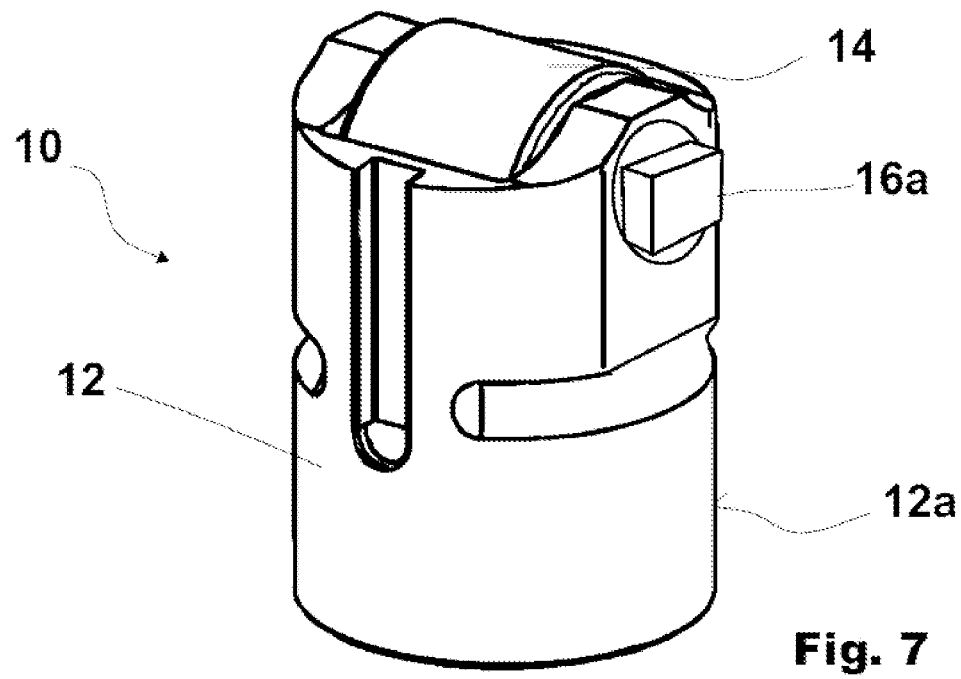
FIG. 7 is a sectional view of a cam follower in accordance with a fifth embodiment of the invention characterized in that the end of the sleeve has a rectangular profile.

Another possible configuration of the end 16a of the sleeve 16 is shown in FIG. 7. The end has a profile different from the circular profile of the main portion of the sleeve 16. The end 16a of the sleeve 16 has a non-circular profile, which is rectangular in the instance shown.

Figure 8:
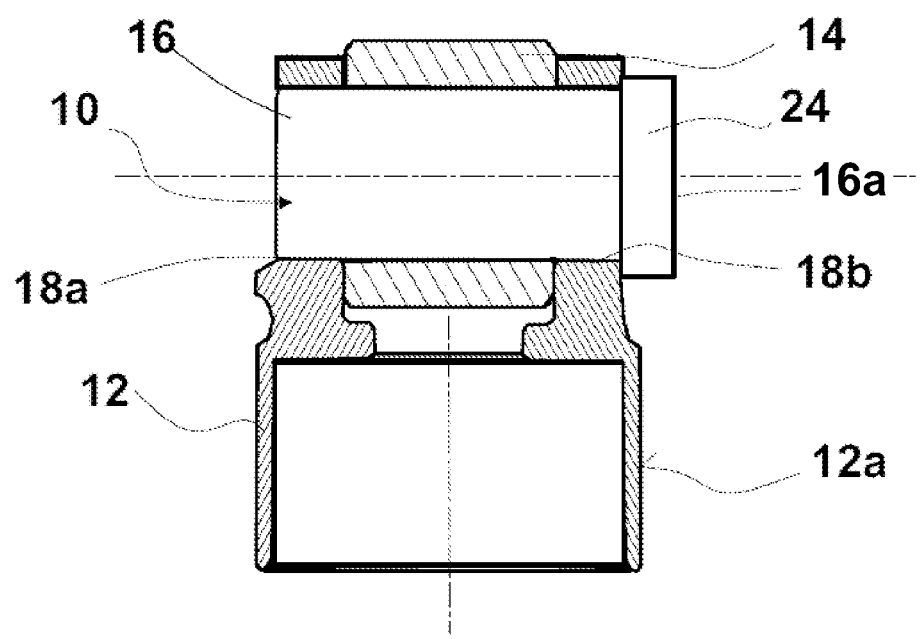
FIG. 8 is a sectional view of a cam follower in accordance with a sixth embodiment of the invention characterized in that the sleeve includes a bolt head.

A further possible configuration of the end 16a of the sleeve 16 is shown in FIG. 8. The sleeve 16 includes a bolt head 24 constituting the end 16a and the anti-rotation device, also preventing any contact of the other end of the sleeve 16 with the wall of the exterior body including the bore.

The invention claimed is:

1. A cam follower including a plunger configured to execute a reciprocating movement in an exterior body, the plunger including:

a plunger body having a cylindrical exterior surface;

an anti-rotation device extending radially beyond the cylindrical exterior surface of the plunger body and configured to engage a matching structure in the exterior body;
a roller providing the contact with a cam;
a sleeve rotatably supporting the roller in the plunger body; and
at least one lateral bore included in the plunger body, wherein the sleeve is inserted in the bore,
wherein the anti-rotation device is one end of the sleeve extending radially beyond the cylindrical exterior surface of the plunger body, and
wherein the sleeve is free-floating in the plunger body.

2. The cam follower as claimed in claim 1, wherein at least one of the axial ends of the sleeve is rounded.

3. The cam follower as claimed in claim 2, wherein at least one of the axial ends of the sleeve has an anti-friction coating.

4. The cam follower as claimed in claim 1, wherein the end of the sleeve has a non-circular profile.

5. The cam follower as claimed in claim 1, the sleeve further includes a bolt head constituting the anti-rotation device.

6. The cam follower as claimed in claim 1, the plunger body further includes two facing lateral bores, the sleeve being inserted in the bores.

7. A cam follower including a plunger configured to execute a reciprocating movement in an exterior body, the plunger including:
a plunger body having a cylindrical exterior surface;
an anti-rotation device extending radially beyond the cylindrical exterior surface of the plunger body and configured to engage a matching structure in the exterior body;
a roller providing the contact with a cam;
a sleeve rotatably supporting the roller in the plunger body; and
at least one lateral bore included in the plunger body, wherein the sleeve is inserted in the bore,
wherein the anti-rotation device is one end of the sleeve extending radially beyond the cylindrical exterior surface of the plunger body, and
wherein the sleeve is not axially fixed relative to the plunger body.

8. A cam follower including a plunger configured to execute a reciprocating movement in an exterior body, the plunger comprising:
a cylindrical plunger body having an exterior surface lying on a cylinder and at least one lateral bore;
a sleeve free-floatingly mounted in the at least one lateral bore; and
a roller rotatably mounted on the sleeve in the plunger body, the roller being configured to contact a cam,
wherein an end of the sleeve projects radially outside the cylinder, the end of the sleeve being configured to engage a matching structure in the exterior body to function as an anti-rotation device.

9. The cam follower as claimed in claim 8, wherein the end of the sleeve has a non-circular profile.

10. The cam follower as claimed in claim 8, wherein the at least one lateral bore comprises a first lateral bore and a second lateral bore spaced from the first lateral bore, the sleeve extending from the first lateral bore to the second lateral bore and the end of the sleeve being located on a side of the second lateral bore opposite the first lateral bore.

11. The cam follower as claimed in claim 8, wherein the end of the sleeve is rounded.

12. The cam follower as claimed in claim 8, wherein the end of the sleeve has an anti-friction coating.

13. The cam follower as claimed in claim 8, the sleeve further includes a bolt head constituting the anti-rotation device.

14. The cam follower as claimed in claim 8, the plunger body further includes two facing lateral bores, the sleeve being inserted in the bores.

* * * * *